United States Patent
Watson et al.

(10) Patent No.: US 8,624,430 B2
(45) Date of Patent: Jan. 7, 2014

(54) STANDBY POWER REDUCTION

(75) Inventors: Eric K. Watson, Crestwood, KY (US); Steven Keith Root, Buckner, KY (US); Jeff Donald Drake, Louisville, KY (US); Ashley Wayne Burt, Louisville, KY (US); Jeffrey S. Weber, Cincinnati, OH (US); Donald Ganiere, Ottawa, IL (US)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 12/621,559

(22) Filed: Nov. 19, 2009

(65) Prior Publication Data

US 2011/0115296 A1 May 19, 2011

(51) Int. Cl.
*H02J 1/00* (2006.01)

(52) U.S. Cl.
USPC ............... 307/31; 307/66; 307/116; 307/126

(58) Field of Classification Search
USPC ..................... 307/31, 116, 126, 66
See application file for complete search history.

(56) References Cited

U.S. PATENT DOCUMENTS

| | | | |
|---|---|---|---|
| 3,919,676 A * | 11/1975 | Bratkowski et al. ......... 335/179 |
| 6,338,536 B1 * | 1/2002 | Ueno et al. .................... 312/405 |
| 6,373,237 B1 | 4/2002 | Oldendorf et al. |
| 6,493,643 B1 | 12/2002 | Aisa |
| 6,703,786 B2 * | 3/2004 | Tannenbaum ................ 315/149 |
| 6,731,274 B2 | 5/2004 | Powell |
| 6,801,836 B2 | 10/2004 | Schanin |
| 7,259,478 B2 | 8/2007 | Sinha |
| 7,340,550 B2 | 3/2008 | Derr et al. |
| 7,394,397 B2 | 7/2008 | Nguyen |
| 7,394,451 B1 | 7/2008 | Patten et al. |
| 7,420,293 B2 | 9/2008 | Donnelly et al. |
| 7,454,635 B2 | 11/2008 | Ito et al. |
| 7,582,985 B2 * | 9/2009 | Murguia ........................ 307/39 |
| 7,769,857 B2 * | 8/2010 | Chang et al. .................. 709/224 |
| 7,872,576 B2 * | 1/2011 | Kalatizadeh .................. 340/540 |
| 2005/0168189 A1 * | 8/2005 | Schweigert .................... 320/107 |
| 2006/0232333 A1 * | 10/2006 | Pirondini et al. ............. 330/253 |
| 2007/0255461 A1 | 11/2007 | Brickfield et al. |
| 2007/0290630 A1 | 12/2007 | Kim |
| 2008/0231121 A1 * | 9/2008 | Yang et al. .................... 307/131 |
| 2010/0050002 A1 * | 2/2010 | Huang .......................... 713/310 |
| 2010/0164301 A1 * | 7/2010 | Chang et al. .................. 307/125 |

* cited by examiner

*Primary Examiner* — Jared Fureman
*Assistant Examiner* — Alfonso Perez Borroto
(74) *Attorney, Agent, or Firm* — Douglas D. Zhang; Global Patent Operation

(57) ABSTRACT

A standby power system for an appliance having a power input coupled to a main power source includes a power enabling device coupled between the main power source and power input of the appliance, a standby power state sensing device coupled to the power enabling device, and a power restore device coupled to the power enabling device.

19 Claims, 6 Drawing Sheets

STANDBY POWER REDUCTION

BACKGROUND OF THE INVENTION

The present invention generally relates to energy conservation in appliances, and more particularly to reducing power draw of a device, such as an appliance, when in a standby or power-saving state.

The standby power state, also referred to as sleep or idle state, generally refers to a low power consumption condition for electrical and electronic devices such as appliance and computers. In a typical standby power state, certain components and/or functions of the device are put to "sleep" or idled, so as to reduce power consumption. These reduced power conditions can have a significant effect on electrical consumption and cost compared to leaving a device fully on and idle, or not actively used.

However, even in the typical standby state, an appliance still consumes a certain amount of electricity or power. This power loss can be significant, when considered in terms of the number of appliances in use. In some cases, when an appliance is not being used for its primary purpose, there is no need for the appliance to consume any power at all. It would be advantageous to be able to determine when an appliance is in a condition in which it does not need to consume power and effectively further reduce or eliminate the power draw of the appliance in that state.

Accordingly, it would be desirable to provide a system that addresses at least some of the problems identified above.

BRIEF DESCRIPTION OF THE INVENTION

As described herein, the exemplary embodiments overcome one or more of the above or other disadvantages known in the art.

One aspect of the exemplary embodiments relates to a standby power system for an appliance having a power input coupled to a main power source. The system includes a power enabling device coupled between the main power source and power input of the appliance, a standby power state sensing device coupled to the power enabling device, and a power restore device coupled to the power enabling device.

Another aspect of the exemplary embodiments relates to a power control system for an appliance. The system includes a power input to the appliance, an external source of electrical power, a power enabling device coupled between the external source of electrical power and the power input to the appliance, and a standby state sensing device coupled to the power enabling device configured to detect an existence of a standby state trigger and transmit a standby state activation signal to the power enabling device.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE INVENTION

Figure 1:
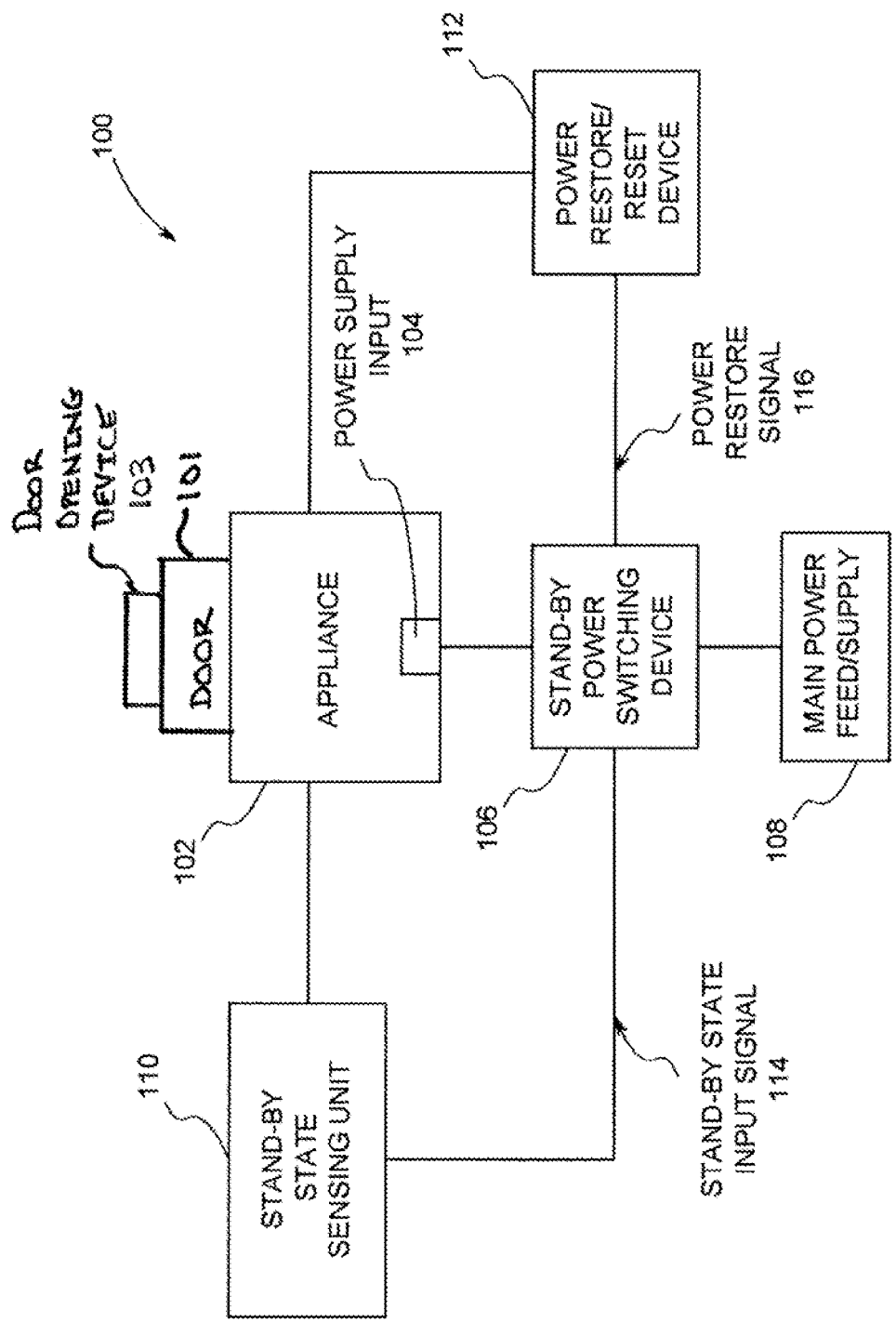
FIG. 1 is a block diagram of a system according to an exemplary embodiment of the present disclosure.

FIG. 1 illustrates a block diagram of an exemplary system 100 incorporating aspects of the disclosed embodiments. The aspects of the disclosed embodiments are generally directed to reducing and/or eliminating electrical power consumption, also referred to herein as "power draw", of an appliance 102, when the appliance 102 is not being used or at least not being used for its intended purpose. This state of the appliance 102 is generally referred to as a "standby" or "sleep" state. In this state, the appliance 102 and its corresponding functions can be switched to a standby operating state, in which the appliance 102 powered down to conserve energy.

As shown in FIG. 1, an appliance 102 includes a power supply source or input 104. The power supply input 104 can comprise a connection point for a power source to the appliance 102, a power control point or a power supply for the appliance 102. In one embodiment, the power supply input 104 can be internal to the appliance 102 and can comprise, for example, a power supply that receives power from an external power source and provides the necessary electrical power to each of the various components of the appliance 102 requiring electrical power. Alternatively, the power supply input 104 can comprise a connection to a suitable external power source.

Generally, a main power feed or supply 108 is used to provide an external source of electrical energy for the appliance 102. The power supply input 104 receives and/or converts the external source of electricity from the main power feed 108 in a suitable manner in order to power the appliance 102 according to the power requirements of the appliance 102.

Figure 2:
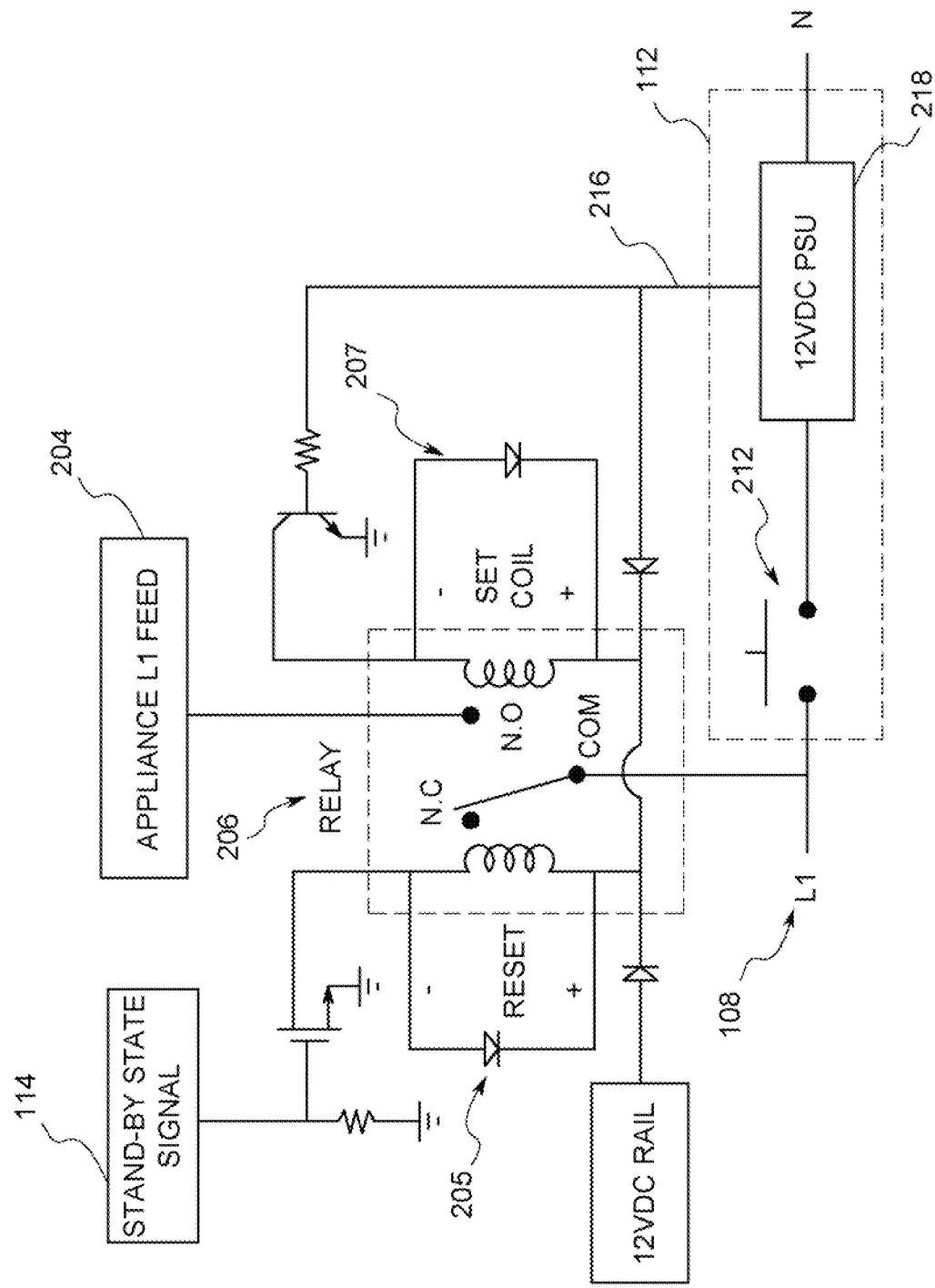
FIG. 2 is a schematic diagram of a power enabling device according to an exemplary embodiment of the present disclosure.

The main power feed 108 generally comprises a connection to the electrical power supplied by the local utility, also referred to as "L1" in FIG. 2. In one embodiment, the main power feed 108 can comprise a wall connection into which a suitable power line or cord connected to the power supply input 104 is coupled. In alternate embodiments, the main power feed 108 can comprise any suitable source of electrical power, such as for example a battery supply, generator or other generated supply of electrical power.

The system 100 of FIG. 1 also includes a standby state power enabling device 106 that is electrically connected between the main power feed 108 and the power supply input 104 to the appliance 102. The standby state power enabling device 106 is generally configured to interrupt the flow of electrical power from the main power feed 108 to the power supply input 104 when a standby-state input signal 114 is detected. During normal operation of the appliance 102, or when the appliance 102 is not in a standby state, the power supply input 104 is electrically coupled to the main power feed 108 in an operational manner. Although the example of FIG. 1 shows the standby state enabling device 106 as being external to the appliance 102, in alternate embodiments, the standby state power enabling device 106 is integral to the appliance 102.

As shown in FIG. 1, the standby state input signal 114 is provided to the standby state power enabling device 106 from a standby state sensing unit 110. In one embodiment, the standby state sensing unit 110 is configured to monitor one or more operating conditions or properties of the appliance 102, or the environment of the appliance 102. These monitored conditions are used to determine when the appliance 102 can be switched to the standby state without adverse consequences. Each monitored condition will have one or predetermined triggers associated therewith. When one or more of the predetermined triggers is detected, the standby state sensing unit 110 generates the standby state activation signal 114.

For example, in one embodiment, the standby state sensing unit 110 includes a proximity or motion detection device. The proximity detection device can be used to determine the presence or absence of a user in an area of the appliance. In this example, a pre-determined trigger is the lack of any activity within a certain area surrounding the appliance 102. If no activity has been detected for a pre-determined period of time, this can indicate that the appliance 102 can be switched to the standby state.

As another example, in one embodiment, the standby state sensing unit 110 includes a clock or timer device. The clock or timer device can be used to detect an elapsed time since last use of the appliance 102. The expiration of a pre-determined time period since last use of the appliance 102 is a pre-determined trigger, and can be used to indicate that the appliance 102 can be switched to the standby state.

Other alternative conditions or triggers that can be used to determine whether the appliance 102 is or is not in a state or condition suitable for switching to the standby state can include, for example, activity level, energy management systems and conditions (demand side management), home automation system settings, preset or user set operational conditions or parameters, lack of controller or serial bus activity, sound or other sensed physical properties such as temperature, pressure, RF energy, wind speed, wind direction, luminous intensity, sound, radio frequency activity, motor position, randomized time events (for satisfying religious practices), etc. For example, certain religious practices may restrict the use of appliances during certain time periods and/or days of the week. A suitable clock or calendaring device can be used to determine these periods and be used to provide or generate the trigger for switching the appliance 102 to the standby state. In alternate embodiments, any suitable conditions or trigger events can be used to determine whether the appliance 102 can be switched to the standby state without adverse consequences. The standby state activation signal 114 will be generated when one or more of these conditions or trigger events are satisfied.

When the standby state activation signal 114 is detected by the standby state power enabling device 108, the standby state power enabling device 108 is configured to switch the appliance to the standby operating state by disengaging or disconnecting the power supply input 104 from the main power feed 108. In this standby state, all power to the appliance 102 is disconnected, resulting in zero power draw from the main power feed 108.

In one embodiment, the system 100 shown in FIG. 1 also includes a power restore or reset device 112. The power reset device 112 is generally configured to cause the standby state power enabling device 106 to restore or enable restoration of electrical power to the appliance 102. In one embodiment, restoring the electrical power to the appliance 102 comprises connecting, or re-establishing the electrical connection between the main power feed 108 and the power supply input 104. The power reset device 112 can be configured to generate the power restore signal 116 in response to one or more triggers. For example, in one embodiment the power reset device 112 is a manual switch requiring a manual input by a user. Activation of the switch restores power to the appliance 102.

In another embodiment, the power reset device 112 is coupled to an external power source, or includes an internal power supply, and is configured to automatically generate the power restore signal 116 based upon one or more triggers. In the example where the power reset device 112 is a switch, when the switch is activated, such as by opening the door 101 to the appliance 102 using the door opener 103 the power restore signal 116 is generated.

As another example, in one embodiment the power reset device 112 comprises a touch sensitive device that could be included in, for example, a frame, handle or other suitable component of the appliance 102. If contact with the appliance 102 is detected, the power reset device 112 generates the power restore signal 116.

The power reset device 112 could also include a proximity sensor. In this embodiment, when the appliance 102 is in the standby state and the power reset device 112 detects a presence of a user in near proximity to the appliance 102, power restore/reset device 112 can cause the power restore signal 116 to be automatically generated. The power reset device 112 can also be configured to automatically generate the power restore signal 116 at a predetermined time, or after a predetermined time period has elapsed since the standby state activation signal 114 was received by the standby power enabling device 106 or the standby state was activated.

Other examples of predetermined conditions or factors that can be used to determine whether the power reset device 112 should generate the power restore signal 116 can include motion detection settings, time of day, an elapsed time period from last use, activity level, energy management systems and conditions (demand side management), home automation system settings, preset, or user set operational conditions or parameters and controller or serial bus activity, sound or other sensed physical properties such as temperature, pressure, RF energy, wind speed, wind direction, luminous intensity, sound, radio frequency activity, motor position, randomized time events (for satisfying religious practices), etc. For example, certain religious practices may restrict the use of appliances during certain time periods and/or days of the week. A suitable clock or calendaring device can be used to determine these periods and when to generate the power restore signal. In alternate embodiments, any suitable or desired condition(s) or triggers can be used as the prerequisites to cause the power reset device 112 to generate the power restore signal 116. The power reset device 112 can be external to the appliance 102 or an integral component thereof.

FIG. 2 illustrates a schematic diagram for an exemplary standby power enabling device 106 of FIG. 1 including a power restore/reset device 112. In the embodiment shown in FIG. 2, the standby power enabling device 206 is an electromechanical device, such as for example, a normally open (NO) latching bistable single pole, single throw (SPST) relay. In alternate embodiments, any suitable relay or enabling device can be used for enabling or switching an electrical connection of the main power feed 108 to the appliance power feed 204 between a closed and open state, such as for example, a TRIAC, DIAC, or Silicone-Controller Rectifier (SCR). Also, while only one relay is shown in FIG. 2, in alternate embodiments, any suitable number of relays can be used.

As illustrated in FIG. 2, in the normally open state of the device 206, the main power feed 108 is electrically connected to the appliance power feed 204. When the standby state activation signal 114 is detected, the reset side 205 of the device 206 is energized. When the reset side 205 of the device 206 is energized, the main power feed 108 is electrically disconnected from the appliance power feed 204. This results in a zero power draw condition for the appliance 102 of FIG. 1. In the example shown in FIG. 2, the reset side 205 of the device 206 has been energized. The relay 206 has latched to the normally closed (NC) position, resulting in the appliance feed 204 being electrically disconnected from the main power feed 108.

The device 206 includes a power reset device 112. In the example shown in FIG. 2, the power reset device 112 comprises a momentary switch 212 and a power supply unit 218. One side of the switch 212 is electrically coupled to the main power feed and the other side of the switch is electrically coupled to the power supply unit 218. The power supply unit 218 generates the power restore signal 216 when the switch 212 is activated, which energizes the set side 207 of the device 206. The power supply unit 218 in this example is a 12 volt DC power supply. In alternate embodiments, any suitable power source can be utilized that will energize the set side 207 of the device 206 when the switch 212 is activated. Although the switch 212 is shown in a normally open state, in alternate embodiments the power reset device 112 can be configured for a switch in a normally closed state.

When the power restore signal 216 is generated, the set side 207 of the device 206 is energized. The device 206 switches to the normally open position and this action electrically connects the main power feed 108 to the appliance power feed 204. While certain circuit elements are shown in FIG. 2 as part of or in addition to the device 206, these elements are merely exemplary, and any suitable circuit elements can be used to set and reset the switching relay of the device 206.

Figure 3:
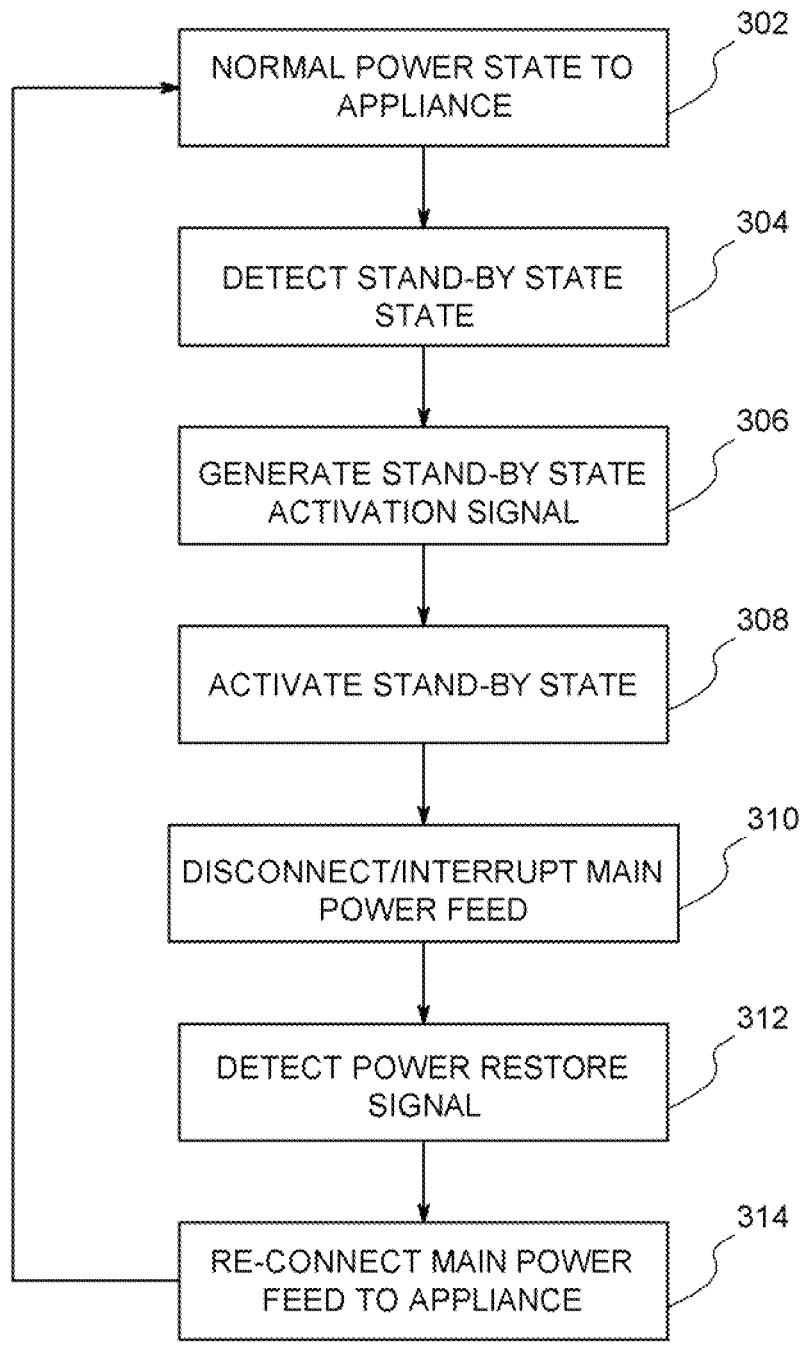
FIG. 3 is a flowchart illustrating an exemplary process flow according to the present disclosure.

FIG. 3 illustrates one example of a process incorporating aspects of the disclosed embodiments. In an operational use state, the appliance 102 of FIG. 1 is powered 302, that is, the appliance power supply input 104 is electrically connected to main power supply 108. A state or condition conducive to operation in the standby operating state is detected 304. The standby state activation signal is generated 306 and the appliance 102 enters 308 the standby state. In the standby operating state, the main power feed 108 to the appliance 102 is electrically disconnected 310 from the power input 104 to the appliance 102, resulting in a no power draw state.

Upon detection 312 of a power restore signal 116, the main power feed 108 is electrically connected 314 to the power input 104 of the appliance 102, resulting in the operational use power state 302 of the appliance 102.

Figure 4:
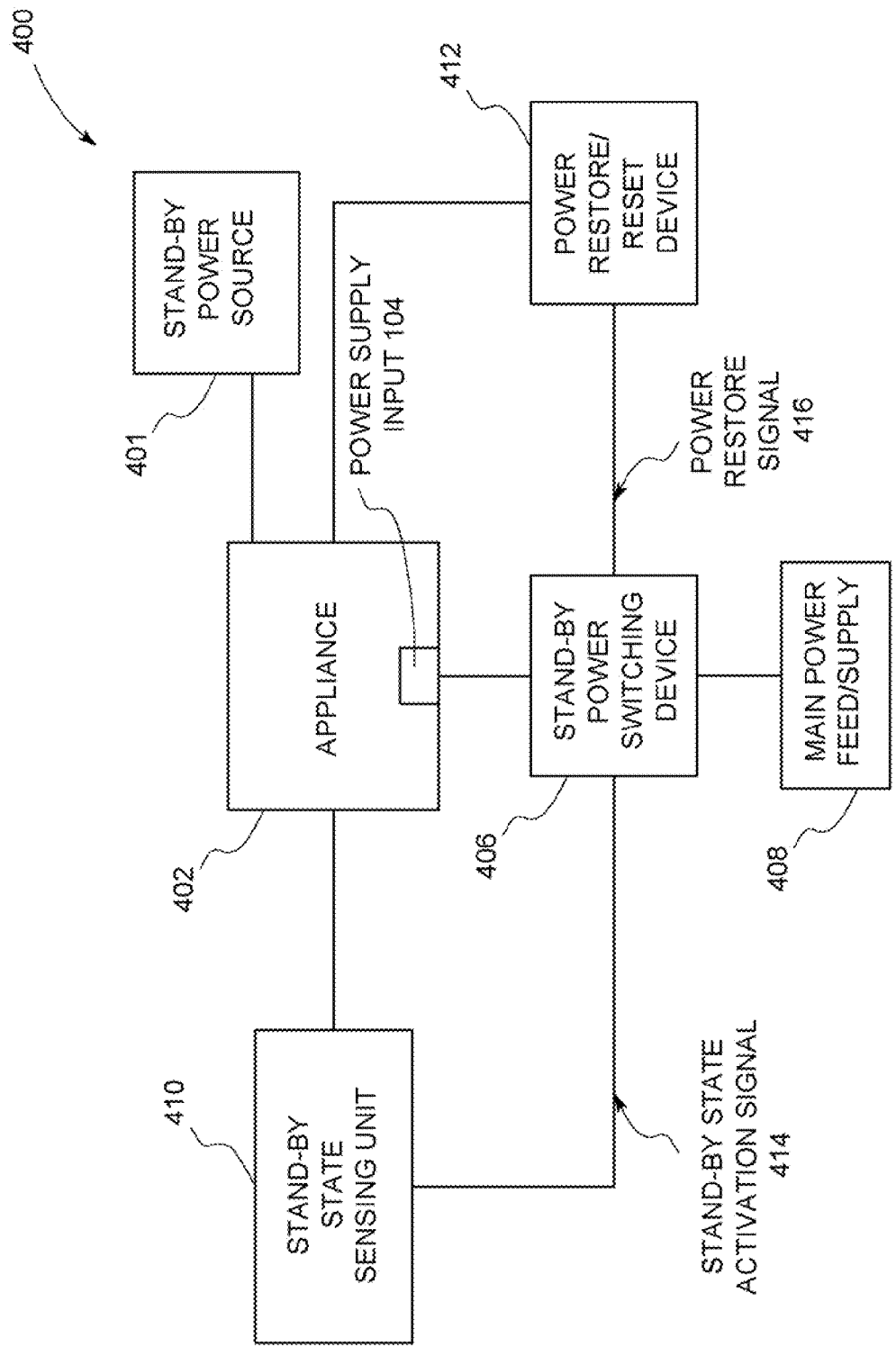
FIG. 4 is a block diagram of one embodiment of a system incorporating aspects of the present disclosure.

FIG. 4 illustrates another embodiment of a system 400 incorporating aspects of the invention. In this embodiment, a standby power source 401 can be used in the standby power state is used to provide electrical power for certain sensing and control devices of the appliance 102. As shown in FIG. 4, the standby power source 401 is external to the appliance 402.

For example, sensing devices that are part of, or coupled to the power restore/reset device 112 can receive power from the power source 401. As another example, a memory of the appliance or time keeping functions can receive power from the standby power source 401 when the appliance 402 is in the standby state. Other devices can include, for example, proximity and touch sensing devices, presence lighting or other indicators and warning devices, interior and exterior lighting, displays, backlights for light emitting diode (LED) displays, vacuum fluorescent displays (VFD), and all other suitable or non-essential loads. Generally, the devices that receive power from the standby power source 401 are low power draw devices, with power requirements in the microwatts, for example.

In one embodiment, the standby power source 401 is an independent power source that comes on when the standby state is activated. The standby power source 401 could store energy when the appliance 402 is powered by the main power feed 108 and then use the stored energy to power certain components of the appliance 402. Examples of standby power sources 401 can include, but are not limited to, battery(s), capacitors, solar and wind power and generators. In this fashion, essential components and/or information can be kept active or enabled, together with the sensing devices that are used to re-enable power to the appliance 402. In one embodiment, the standby power source 401 is coupled via line 401a to the main power feed/supply 108. In alternate embodiments, the standby power source 401 can receive electrical power from any suitable power source.

Figure 5:
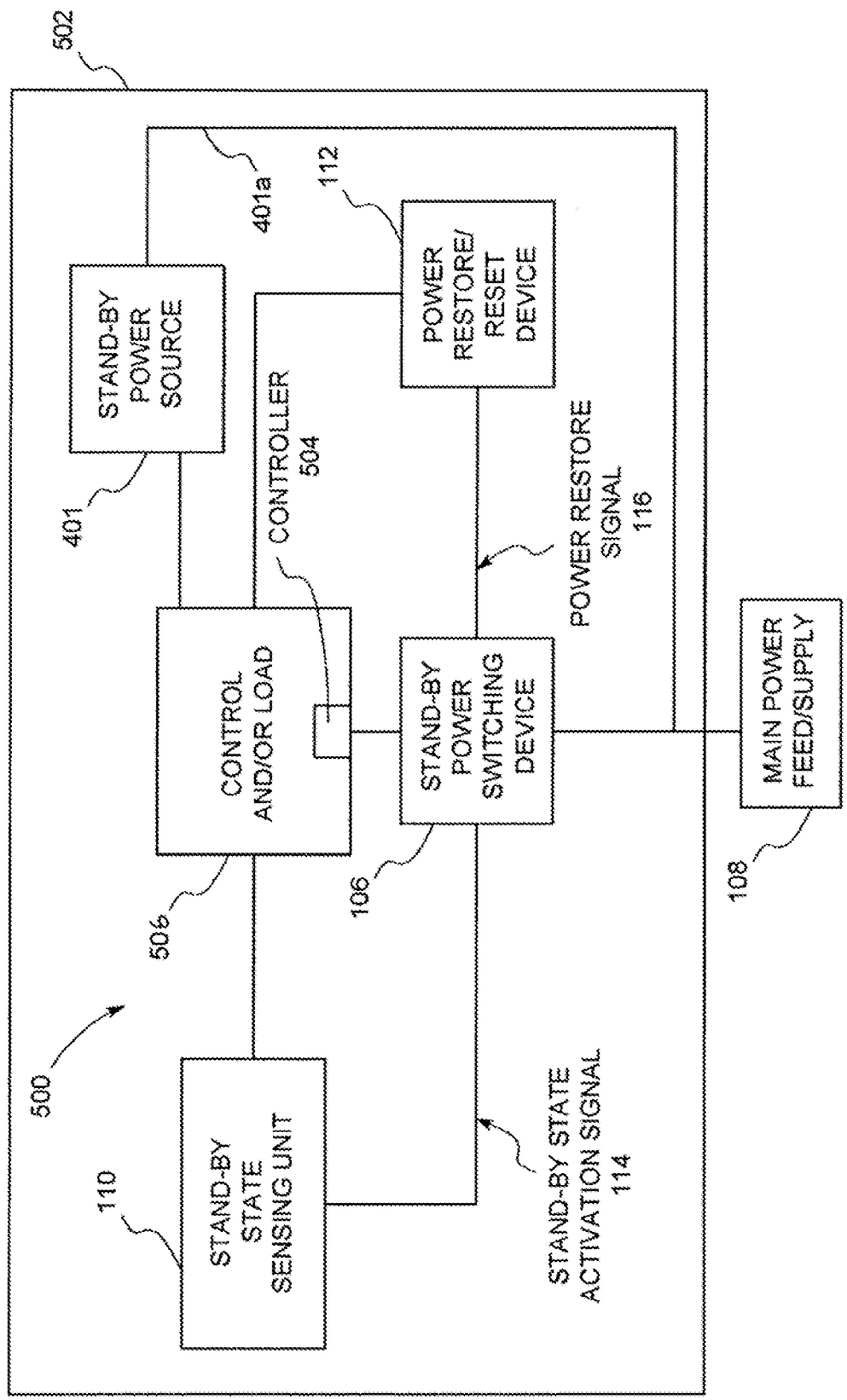
FIG. 5 is a block diagram of another embodiment of a system incorporating aspects of the present disclosure.

FIG. 5 illustrates an example a system 500 that is similar with respect to the embodiment shown in FIG. 4, except that the system 500 is configured to be internal to the appliance 502. In the example of FIG. 5, the power enabling device 506 is coupled to suitable loads, controls, or other electrical power consuming components of the appliance 502. The coupling can be direct or indirectly through a suitable controller 504.

Figure 6:
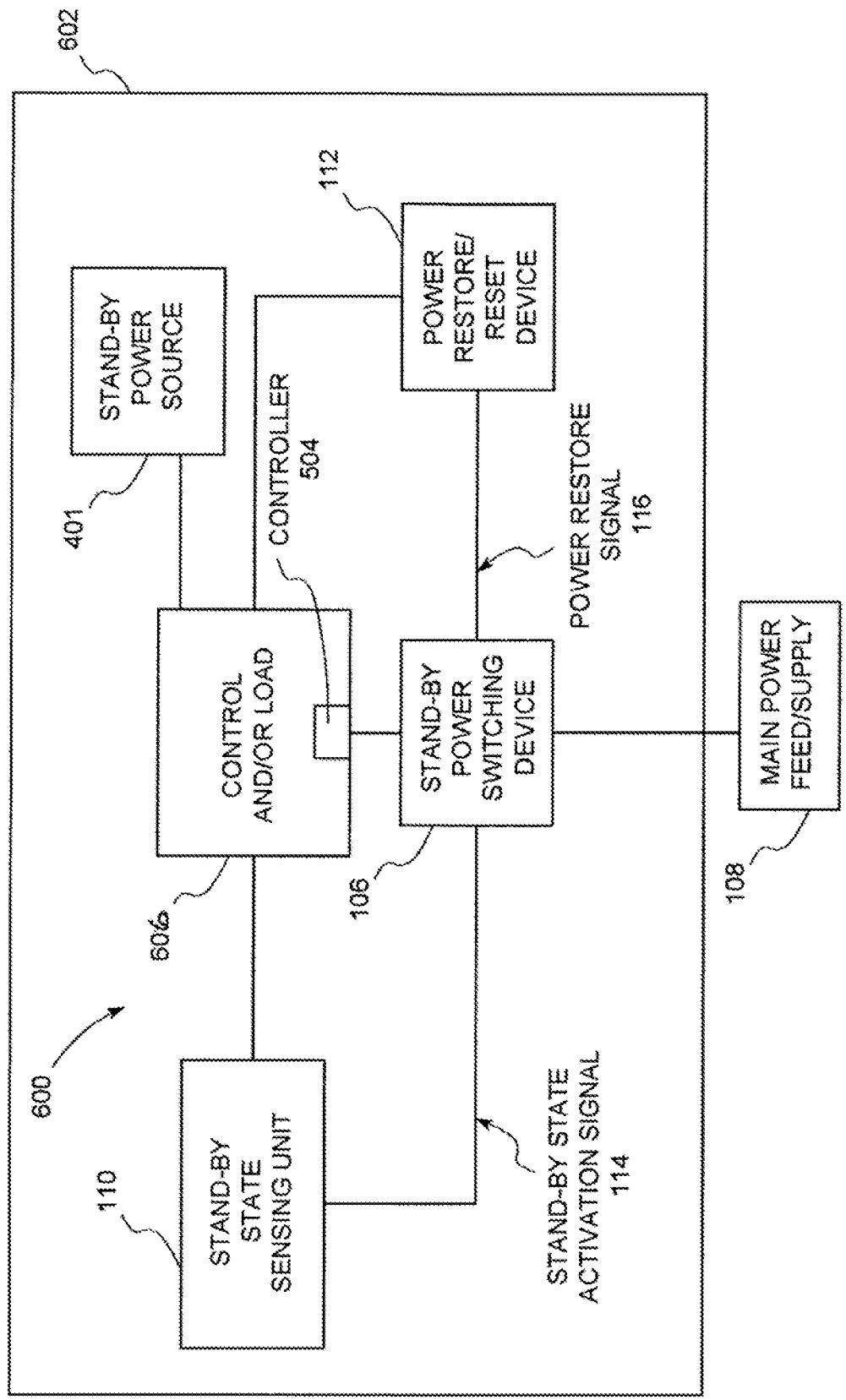
FIG. 6 is a block diagram of a further embodiment of a system incorporating aspects of the present disclosure.

FIG. 6 is illustrative of a system 600, similar to the system 100 of FIG. 1, except that the system 600 is configured to be integral or internal to the appliance 602. In this embodiment, the power enabling device 606 is coupled, either directly or indirectly through a controller 504, to the suitable loads, controls and other electrical power consuming components of the appliance 602.

The aspects of the disclosed embodiments will reduce or eliminate the power consumption of an appliance or other equipment when in the "standby power state." In one embodiment the system automatically disconnects the main power feed from the electronics or electrical components of the appliance. This results in a zero power draw situation. The main power feed can automatically reconnected when desired by activation of a sensing mechanism or realizing a predetermined condition. In addition, a standby power source can be utilized to provide a certain amount of power in order to keep essential components active when all or some of the components of the appliance are disconnected from the main power source. This reduces the standby state power draw of the appliance.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A standby power system for an appliance having a power input coupled to a main power source, comprising:
   a power enabling device coupled electrically in series between the main power source and the power input of the appliance, the power enabling device being configured to electrically disconnect the power input of the appliance from the main power source and not consume electric power in a standby state;
   a standby state sensing device coupled to the power enabling device, the standby state sensing device being configured to monitor one or more conditions other than a load current to the power input of the appliance to detect the standby state and generate a standby state signal; and
   a power restore device coupled to the power enabling device configured to generate a power restore signal and cause the power enabling device to electrically connect the power input of the appliance to the main power source,
   wherein the power enabling device comprises a reset side electrically coupled to the standby state sensing unit configured to receive the standby state signal and a set side electrically coupled to the power restore device to receive the power restore signal, the power enabling device only consuming electrical power during receipt of the standby state signal or the power restore signal.

2. The standby power system of claim 1, wherein the power enabling device comprises a bistable relay that electrically connects the power input of the appliance to the main power source in one state, and disconnects the power input of the appliance from the main power source in another state.

3. The standby power system of claim 1, wherein the detected standby state comprises at least one of a user proximity to the appliance, elapsed time from last use, ambient light level, activity level unrelated to power consumption, motion sensing, manual input, power management control input, energy management commands, time of day, user presets, control status sensing, and intermodule communication.

4. The standby power system of claim 1, wherein the detected standby state comprises a sensed physical property of the appliance other than a load current to the power input of the appliance.

5. The standby power system of claim 4, wherein the sensed physical property comprises at least one of pressure, temperature, wind speed, wind direction, luminous intensity, and sound.

6. The standby power system of claim 1, wherein the detected standby state comprises a randomized time event.

7. The standby power system of claim 1, wherein the power restore device comprises a switch that is configured to provide a power-on signal to the power enabling device to cause the power enabling device to automatically connect the main power source to the power input of the appliance.

8. The standby power system of claim 7, wherein the switch comprises a manually activated switch configured to provide the power-on signal to the power enabling device when activated.

9. The standby power system of claim 7, wherein the appliance further comprises:
   at least one door; and
   a door opening device coupled to each of the at least one door;
   wherein the switch is coupled to the door opening device and is configured to generate the power-on signal when the door opening device is activated to open a respective door.

10. The standby power system of claim 7, wherein the appliance includes a body, and the switch is incorporated in the body of the appliance.

11. The standby power system of claim 1, further comprising a standby power source coupled to the appliance, the standby power source configured to provide electrical power to predetermined electrical components of the appliance in the standby state.

12. The standby power system of claim 7, wherein the switch is a touch sensitive switch or a proximity sensor.

13. A power control system for an appliance, comprising:
   a power input to the appliance;
   an external source of electrical power;
   a power enabling device coupled electrically in series between the external source of electrical power and the power input to the appliance, the power enabling device being configured to, in a standby state, electrically disconnect the power input of the appliance from the external source of electrical power and not consume electric power; and
   a standby state sensing device coupled to the power enabling device and configured to detect an existence of a standby state trigger other than a load current to the power input to the appliance and transmit a standby state activation signal to the power enabling device to switch to the standby state;
   wherein the power enabling device comprises a reset side electrically coupled to the standby state sensing device configured to receive the standby state activation signal and a set side to electrically connect the power input of the appliance to the external source of electrical power.

14. The power control system of claim 13, wherein the power enabling device is configured to disconnect the external source of electrical power from the power input to the appliance when the standby state activation signal is detected.

15. The power control system of claim 13, further comprising a power restore device coupled to the set side of the power enabling device, the power restore device configured to provide a power restore signal to the set side of the power enabling device causing the power enabling device to establish the electrical connection between the external source of electrical power and the power input to the appliance.

16. The power control system of claim 15, wherein the power restore device is a manually activated switch or a signal triggered by a manual input setting.

17. The power control system of claim 14, further comprising a standby power source electrically connected to or within the appliance, the standby power source configured to provide a minimum source of electrical power to control components of the appliance when the standby state activation signal is detected and the power input to the appliance is disabled from the external source of electrical power.

18. The power control system of claim 17, wherein the standby power source comprises an energy storage device.

19. The power control system of claim 13, wherein the power enabling device consumes electrical power only when electrically connecting or disconnecting the power input of the appliance and the external source of electrical power.

* * * * *